United States Patent
Miki et al.

(10) Patent No.: US 8,204,424 B2
(45) Date of Patent: Jun. 19, 2012

(54) CLEANING BLADE FOR ELECTROPHOTOGRAPHIC DEVICE AND METHOD FOR MANUFACTURING THE SAME

(75) Inventors: Takashi Miki, Hyogo (JP); Takayuki Nagase, Hyogo (JP); Sadaharu Nakamura, Hyogo (JP)

(73) Assignee: Bando Chemical Industries, Ltd., Hyogo (JP)

( * ) Notice: Subject to any disclaimer, the term of this patent is extended or adjusted under 35 U.S.C. 154(b) by 391 days.

(21) Appl. No.: 12/518,493

(22) PCT Filed: Nov. 8, 2007

(86) PCT No.: PCT/JP2007/071740
§ 371 (c)(1),
(2), (4) Date: Jun. 10, 2009

(87) PCT Pub. No.: WO2008/078461
PCT Pub. Date: Jul. 3, 2008

(65) Prior Publication Data
US 2010/0150628 A1   Jun. 17, 2010

(30) Foreign Application Priority Data
Dec. 22, 2006 (JP) ................... 2006-346485
Dec. 22, 2006 (JP) ................... 2006-346486

(51) Int. Cl.
*G03G 21/00* (2006.01)
(52) U.S. Cl. ........ 399/350; 399/264; 399/273; 399/274; 399/283; 399/284
(58) Field of Classification Search .......... 399/264, 399/273, 274, 283, 284, 350
See application file for complete search history.

(56) References Cited

U.S. PATENT DOCUMENTS
3,461,185 A * 8/1969 Brown ............................ 525/478
7,418,231 B2 * 8/2008 Ueno et al. .................... 399/350
(Continued)

FOREIGN PATENT DOCUMENTS
JP    8-020724    1/1996
(Continued)

OTHER PUBLICATIONS
International Search Report for International Application No. PCT/JP2007/071740, Sep. 10, 2009.

Primary Examiner — David Gray
Assistant Examiner — Francis Gray
(74) Attorney, Agent, or Firm — Greenblum & Bernstein, P.L.C.

(57) ABSTRACT

The present invention provides a cleaning blade for an electrophotographic device, which, even when spherical (perfectly spherical or irregularly shaped), polymerized toner with a small particle diameter is used, can achieve sufficient abrasion resistance and sufficient cleaning ability (particularly cleaning ability under low-temperature and low-humidity conditions). The cleaning blade for an electrophotographic device includes an elastic rubber member; and a supporting member. The elastic rubber member has a double layer structure including an edge layer and a base layer. The edge layer is made of a material with a JIS-A hardness of 65° to 72° at 23° C. and a rebound resilience of 10 to 35%. The base layer is made of a material with a JIS-A hardness of 70° to 80° at 23° C. and a rebound resilience of 40 to 70%, the JIS-A hardness value being larger than the value of hardness of the edge layer.

15 Claims, 4 Drawing Sheets

U.S. PATENT DOCUMENTS

| | | | |
|---|---|---|---|
| 2003/0194250 A1* | 10/2003 | Ishigaki | 399/279 |
| 2006/0140692 A1 | 6/2006 | Abe et al. | |
| 2007/0059049 A1* | 3/2007 | Onuma et al. | 399/284 |
| 2009/0003905 A1* | 1/2009 | Ueno et al. | 399/350 |

FOREIGN PATENT DOCUMENTS

| | | |
|---|---|---|
| JP | 2000-172068 | 6/2000 |
| JP | 2001242758 | 9/2001 |
| JP | 2002-214989 | 7/2002 |
| JP | 2002-214990 | 7/2002 |
| JP | 2003-029594 | 1/2003 |
| JP | 2004-184462 | 7/2004 |
| JP | 2006053514 | 2/2006 |
| JP | 2006-162804 | 6/2006 |
| JP | 2006162804 A * | 6/2006 |
| JP | 2006-195251 | 7/2006 |
| JP | 2006-209088 | 8/2006 |
| JP | 2006-343411 | 12/2006 |

* cited by examiner (i)

(ii)

(i)

(ii)

(a)

(b)

US 8,204,424 B2

CLEANING BLADE FOR ELECTROPHOTOGRAPHIC DEVICE AND METHOD FOR MANUFACTURING THE SAME

TECHNICAL FIELD

The present invention relates to a cleaning blade for an electrophotographic device and a method of producing the same.

BACKGROUND ART

In an electrophotographic device for which plain paper is used as recording paper, a copy is generally made through the following steps. First, the surface of an image carrier is charged electrostatically by a discharge and then an image is illuminated to be projected on the surface of the carrier, so that an electrostatic latent image is formed. Next, charged toner is adhered on the electrostatic latent image and thus a toner image is developed. The toner image is transferred to recording paper and lastly, the recording paper with the toner image transferred thereto is heated and pressurized so as to fix the toner on the recording paper.

Accordingly, in order for an electrophotographic device to sequentially print on a plurality of pieces of paper, the residual toner on the surface of the image carrier needs to be removed after the toner image has been transferred from the image carrier to the recording paper in the above step. Such residual toner is generally removed by a cleaning blade for an electrophotographic device. A cleaning blade for an electrophotographic device is generally formed of a supporting member made of a metal plate, an elastic rubber member, and an adhesive layer for joining the supporting member and the elastic rubber member together.

Since electrophotographic devices have been recently required to produce printed materials of a higher level of quality, polymerized toner having a more spherical (perfectly spherical or irregularly shaped) particle shape and a smaller particle diameter than conventional pulverized toner has come to be used. Polymerized toner particles of this kind easily roll, and thus the residual toner particles may pass under the blade, which may result in cleaning failure.

In order to solve the above problem, a conventional cleaning blade that has an elastic rubber member with high hardness and high rebound resilience can be used since it has an advantage in the cleaning ability; however, such a cleaning blade has a short life span because of its poor abrasion resistance (durability), and therefore the blade needs to be changed frequently. In the case where a cleaning blade designed to maintain the abrasion resistance of the blade is used, on the other hand, the cleaning ability (the cleaning ability particularly under low-temperature and low-humidity conditions) are decreased. That is, in the case where polymerized toner is used, it is very difficult to achieve both sufficient abrasion resistance and sufficient cleaning ability with the conventional techniques.

Patent Document 1 discloses a cleaning blade having a double layer structure with an area to come into contact with a photoreceptor and an area not to come into contact with the photoreceptor. Here, the area to come into contact with the photoreceptor has high rebound resilience (30 to 70%) and the area not to come into contact with the photoreceptor has low rebound resilience (5 to 40%). Patent Documents 2 and 3 each disclose a cleaning blade for an electrophotographic device which includes a supporting member and an elastic rubber member that has a double layer structure with an edge layer and a base layer, each of the layers having specific hardness and rebound resilience.

However, the hardness and rebound resilience of the respective edge layer and base layer of those cleaning blades have not been studied in detail. Further, the cleaning blades disclosed therein might not be able to achieve both sufficient abrasion resistance (durability) and sufficient cleaning ability (particularly under low-temperature and low-humidity conditions).

Patent Document 1: JP 2003-29594 A
Patent Document 2: JP 2002-214989 A
Patent Document 3: JP 2002-214990 A

SUMMARY OF THE INVENTION

An object of the present invention is to provide, in view of the above described current conditions, a cleaning blade for an electrophotographic device, which, even when spherical (perfectly spherical or irregularly shaped), polymerized toner with a small particle diameter is used, can achieve both sufficient abrasion resistance and sufficient cleaning ability (cleaning ability particularly under low-temperature and low-humidity conditions).

A first aspect of the present invention is a cleaning blade for an electrophotographic device which includes: an elastic rubber member; and a supporting member, wherein the elastic rubber member has a double layer structure including an edge layer and a base layer, the edge layer is made of a material with a JIS-A hardness of 65° to 72° at 23° C. and a rebound resilience of 10 to 35%, and the base layer is made of a material with a JIS-A hardness of 70° to 80° at 23° C. and a rebound resilience of 40 to 70%, the JIS-A hardness value being larger than the value of hardness of the edge layer.

In the above first aspect of the present invention, the elastic rubber member preferably has a thickness ratio (a/(a+b)) of 0.05 to 0.5, which is a ratio of a thickness (a) of the edge layer to a sum (a+b) of the thickness (a) of the edge layer and a thickness (b) of the base layer, and the thickness (a) of the edge layer is preferably more than 50 μm.

In the above first aspect of the present invention, the edge layer preferably has a 200% modulus of within the range of 3.5 to 12 MPa at 23° C.

Further, in the above first aspect of the present invention, the edge layer preferably has a JIS-A hardness of 65° to 68° at 23° C. and the base layer preferably has a rebound resilience of 45 to 70%.

A second aspect of the present invention is a cleaning blade for an electrophotographic device which includes: an elastic rubber member; and a supporting member, wherein the elastic rubber member has a double layer structure including an edge layer and a base layer, the edge layer is made of a material with a JIS-A hardness of 65° to 72° at 23° C., a rebound resilience of 37 to 60%, and a 200% modulus of 3 to 8 MPa at 23° C., and the base layer is made of a material with a JIS-A hardness of 65° to 70° at 23° C. and a rebound resilience of 5 to 30%.

In the above second aspect of the present invention, the elastic rubber member preferably has a thickness ratio (a/(a+b)) of 0.05 to 0.75, which is a ratio of a thickness (a) of the edge layer to a sum (a+b) of the thickness (a) of the edge layer and a thickness (b) of the base layer, and the thickness (a) of the edge layer is preferably more than 50 μm.

In the above second aspect of the present invention, the edge layer is preferably made of a material with a JIS-A hardness of 65° to 68° at 23° C.

In the first and second aspects of the present invention, the edge layer and the base layer each are preferably made of a polyurethane.

In the first and second aspects of the present invention, the polyurethane contains a polyol unit that is derived from a polycaprolactone polyol and/or a polyester polyol.

In the first aspect of the present invention, the edge layer is made of a polyurethane containing a polyol unit that is derived from a polycaprolactone polyol and/or a polyester polyol, and the base layer is made of a polyurethane containing a polyol unit that is derived from a polycaprolactone polyol.

In the second aspect of the present invention, the edge layer is made of a polyurethane containing a polyol unit that is derived from a polycaprolactone polyol, and the base layer is made of a polyurethane containing a polyol unit that is derived from a polyester polyol.

The present invention also relates to a method of producing the cleaning blade for an electrophotographic device of the first aspect of the present invention, the method employing centrifugal molding. The method includes the steps of: (I) producing a silicone rubber molded body inside a mold; (II) producing a molded body that is to be an edge layer of an elastic rubber member, on the silicone rubber molded body produced in the step (I); and (III) producing a molded body that is to be a base layer of the elastic rubber member, on the molded body that is to be the edge layer which has been produced in the step (II), wherein the molded body to be the edge layer is made of a material with a JIS-A hardness of 65° to 72° at 23° C. and a rebound resilience of 10 to 35%, and the molded body to be the base layer is made of a material with a JIS-A hardness of 70° to 80° at 23° C. and a rebound resilience of 40 to 70%, the JIS-A hardness value being larger than the value of hardness of the edge layer.

The present invention also relates to a method of producing the cleaning blade for an electrophotographic device of the second aspect of the present invention, the method employing centrifugal molding. The method includes the steps of: (I) producing a silicone rubber molded body inside a mold; (II) producing a molded body that is to be an edge layer of an elastic rubber member, on the silicone rubber molded body produced in the step (I); and (III) producing a molded body that is to be a base layer of the elastic rubber member, on the molded body that is to be the edge layer which has been produced in the step (II), wherein the molded body to be the edge layer is made of a material with a JIS-A hardness of 65° to 72° at 23° C., a rebound resilience of 37 to 60%, and a 200% modulus of 3 to 8 MPa at 23° C., and the molded body to be the base layer is made of a material with a JIS-A hardness of 65° to 70° at 23° C. and a rebound resilience of 5 to 30%.

In the methods of producing the respective cleaning blades for an electrophotographic device of the first and second aspects of the present invention, the silicone rubber molded body is preferably produced from an addition curable silicone rubber composition.

In the methods of producing the respective cleaning blades for an electrophotographic device of the first and second aspects of the present invention, the addition curable silicone rubber composition preferably contains an organopolysiloxane with at least two unsaturated aliphatic hydrocarbon groups bonded to a silicon atom; an organohydrogen polysiloxane with at least two hydrogen atoms bonded to a silicon atom; and a platinum-based catalyst.

Hereinafter, the present invention will be described in detail.

DETAILED DESCRIPTION OF THE INVENTION

[Cleaning Blade for Electrophotographic Device]

A cleaning blade for an electrophotographic device of the present invention (hereinafter referred also to simply as a "cleaning blade") includes an elastic rubber member having the following structure (A) (the first aspect of the present invention), or an elastic rubber member having the following structure (B) (the second aspect of the present invention).

(A) An elastic rubber member having a double layer structure that includes an edge layer with low hardness and low rebound resilience (hardness: 65° to 72°, rebound resilience: 10 to 35%) and a base layer with high hardness and high rebound resilience (hardness: 70° to 80°, a value larger than the value of the edge layer; rebound resilience: 40 to 70%).

(B) An elastic rubber member having a double layer structure that includes an edge layer with low hardness, high rebound resilience (hardness: 65° to 72°, rebound resilience: 37 to 60%), and a specific modulus, and includes a base layer with low hardness and low rebound resilience (hardness: 65° to 70°, rebound resilience: 5 to 30%).

Since an elastic rubber member with the above structure (A) or (B) is provided in the present invention, the cleaning blade of the present invention can successfully achieve both sufficient abrasion resistance (durability) and sufficient cleaning ability (particularly under low-temperature and low-humidity conditions) which used to be difficult to achieve, even when spherical (perfectly spherical or irregularly shaped), polymerized toner with a small particle diameter is used.

Although the reason that the cleaning blade of the present invention can achieve both sufficient abrasion resistance and sufficient cleaning ability (particularly under low-temperature and low-humidity conditions) is not revealed, the following effects are considered to be factors in the achievement. In the following, the effects are described in comparison with the effects exerted by a conventional cleaning blade.

FIG. 1(i) is an exemplary schematic view illustrating a cleaning blade that has a known single-layer elastic rubber member with high hardness and high rebound resilience. The cleaning blade in FIG. 1(i) has an elastic rubber member 1 with high hardness and high rebound resilience, a supporting member 2, and an adhesive layer 3. FIG. 1(ii) is a schematic view illustrating cleaning behavior of this cleaning blade toward the surface of an image carrier (partner material) 4. This view illustrates a situation in which the edge of the elastic rubber member 1 scrapes residual toner (not illustrated) off the partner material 4 while the partner material 4 is working.

As illustrated in FIG. 1(ii), when the edge of the elastic rubber member 1 gets strained in the cleaning behavior of the blade that has the conventional elastic rubber member with high hardness and high rebound resilience, stress is concentrated in a narrow range portion (stress concentration zone 5) near the edge due to the high hardness of the elastic rubber member 1. The concentration of stress causes higher friction between the narrow range portion and the partner material 4 and thus the elastic rubber member 1 may peel off. It is assumed that the abrasion resistance would be thereby decreased. Further, a stick-slip behavior of the elastic rubber member 1 attributed to its high rebound resilience is considered to cause severe vibration of the edge, which presumably promotes abrasion of the elastic rubber member 1. Therefore, in the case where the conventional cleaning blade is used, the residual toner particles pass under the blade because of abrasion and deterioration of the blade edge. As a result, cleaning ability may be poor.

On the other hand, the cleaning blade for an electrophotographic device of the present invention has, for example, a structure that is illustrated in FIG. 2(i). The cleaning blade in FIG. 2(i) has an elastic rubber member 11, a supporting member 12, and an adhesive layer 13. FIG. 2(ii) is also a schematic view illustrating the cleaning behavior of the cleaning blade having a structure of the above kind toward the surface of an image carrier (partner material) 14. The view illustrates a state in which the edge of an edge layer 21 scrapes residual toner (not illustrated) off the partner material 14 while the partner material 14 is working.

The elastic rubber member 11 (illustrated in FIG. 2(i)) of the cleaning blade of the first aspect of the present invention (hereinafter referred also to as a "first cleaning blade") has a double layer structure that includes the edge layer 21 with low hardness and low rebound resilience and a base layer 22 with high hardness and high rebound resilience (structure (A)).

The first cleaning blade (structure (A)) works as illustrated in FIG. 2(ii); the presumption here is that, since the edge layer 21, which is in contact with the partner material 14, has low hardness and low rebound resilience, the stress generated near the edge during the cleaning can be more dispersed (a stress concentration zone 15) than in the case where the conventional blade is used. Further, during the use of the cleaning blade, the vibration of the edge in contact with the partner material 14 is suppressed. Those effects presumably make it possible to suppress the abrasion of the cleaning blade (improvement in the abrasion resistance). At the same time, since the base layer 22 abutting the supporting member 12 has high hardness and high rebound resilience, a nip position of the edge can presumably be stabilized and the rubber elasticity as the whole elastic rubber member can presumably be maintained; hence, the cleaning ability (particularly under low-temperature and low-humidity conditions) can be improved (improvement of the cleaning ability particularly under low-temperature and low-humidity conditions).

The elastic rubber member 11 (illustrated in FIG. 2(i)) of the cleaning blade of the second aspect of the present invention (hereinafter referred also to as a "second cleaning blade") has a double layer structure that includes the edge layer 21 with low hardness, high rebound resilience, and a specific modulus, and includes a base layer 22 with low hardness and low rebound resilience (structure (B)).

The second cleaning blade (structure (B)) works as illustrated in FIG. 2(ii); the presumption here is that, since the edge layer 21, which is in contact with the partner material 14, has low hardness, high rebound resilience, and the specific modulus, the stress generated near the edge during the cleaning can be more dispersed (stress concentration zone 15) than in the case where the conventional blade is used. As a result, the abrasion of the cleaning blade can be suppressed (improvement in the abrasion resistance). At the same time, since the damper effects are caused by low hardness and low rebound resilience of the base layer 22 abutting the supporting member 12, a nip position of the edge is considered to be stabilized and the stress exerted on the edge is considered to be suppressed so that the abrasion is suppressed (improvement of the abrasion resistance).

Therefore, the above-described effects are considered as the reason that the first and second cleaning blades can achieve both sufficient cleaning ability (particularly under low-temperature and low-humidity conditions) and sufficient durability (abrasion resistance) even when the polymerized toner is used.

The above first and second cleaning blades each include the elastic rubber member and the supporting member.

The elastic rubber member is for scraping the toner, additives and the like off the surface of the image carrier when the cleaning blade is in use, and has the double layer structure including the edge layer and the base layer.

The edge layer is positioned on the side which is to be in contact with the partner material, in the elastic rubber member, and extends in the blade length direction, as illustrated in FIG. 2. On the other hand, the base layer is positioned on the supporting member side in the elastic rubber member, and extends in the blade length direction. The edge layer of the cleaning blade illustrated in FIG. 2 does not join the supporting member, and the base layer thereof joins the supporting member through the adhesive layer. Here, the term "join" means to contact with each other.

The edge layer in the elastic rubber member (structure (A)) of the first cleaning blade is made of a material with a JIS-A hardness of 65° to 72° at 23° C. and a rebound resilience of 10 to 35%. The base layer in the elastic rubber member of the first cleaning blade is made of a material with a JIS-A hardness of 70° to 80° at 23° C. and a rebound resilience of 40 to 70%, the JIS-A hardness value being larger than the value of hardness (65° to 72°) of said edge layer. Provision of an elastic rubber member having a double layer structure that includes the edge layer and the base layer with such hardness and rebound resilience can lead to achievement of both sufficient abrasion resistance and sufficient cleaning ability (particularly under low-temperature and low-humidity conditions).

The first cleaning blade can exert the above effects such as the stress distribution and maintenance of the rubber elasticity so as to achieve both sufficient abrasion resistance and sufficient cleaning ability (particularly under low-temperature and low-humidity conditions), when provided with all the following characteristics: (i) the edge layer has a hardness of within the above specific range; (ii) the edge layer has a rebound resilience of within the above specific range; (iii) the base layer has a hardness of within the above specific range; (iv) the hardness value of the base is larger than the value of hardness of the edge layer; and (v) the base layer has a rebound resilience of within the above specific range. That is, even in the case where the first cleaning blade lacks only any one of the characteristics (i) to (v), both sufficient abrasion resistance and sufficient cleaning ability are difficult to achieve. Provision of an elastic rubber member simply having a double layer structure is not enough to achieve the above objects. It is thus highly important that the first cleaning blade be provided with all the characteristics (i) to (v).

If the edge layer in the first cleaning blade has a hardness of lower than 65°, the nip width of the edge gets widened to decrease the blade's capacity of preventing the passing of the toner particles. On the other hand, if the edge layer has a hardness of higher than 72°, the abrasion resistance is decreased because of the above reason. The hardness of the edge layer is preferably from 65° to 70°, and more preferably from 65° to 68°.

If the edge layer in the first cleaning blade has a rebound resilience of lower than 10%, the cleaning ability under low-temperature and low-humidity conditions is significantly decreased. On the other hand, if the edge layer has a rebound resilience of higher than 35%, the abrasion resistance is decreased because of the above reason. The rebound resilience of the edge layer is preferably from 15 to 33%, and more preferably from 15 to 27%.

The 200% modulus of the edge layer in the first cleaning blade at 23° C. is preferably within the range of 3.5 to 12 MPa.

If the 200% modulus of the edge layer is lower than 3.5 MPa, the edge may be greatly deformed and thus the abrasion resistance may be decreased. On the other hand, if the 200% modulus of the edge layer is higher than 12 MPa, the stress generated near the edge may not be allowed to be distributed and thus the abrasion resistance may be decreased. The 200% modulus of the edge layer is more preferably from 3.5 to 8.0 MPa, and even more preferably from 4.0 to 7.0 MPa.

A hardness of lower than 70° of the base layer in the first cleaning blade does not contribute to stabilization of nipping of the edge and to improvement of the cleaning ability under low-temperature and low-humidity conditions. On the other hand, a hardness of higher than 80° raises the level of stress generated near the edge and thus the abrasion resistance is decreased. The hardness of the base layer is preferably from 70° to 78°, and more preferably from 73° to 77°.

A value of hardness of the base layer in the first cleaning blade not larger than the value of hardness of the edge layer does not contribute to stabilization of the nip of the edge and to improvement of the cleaning ability under low-temperature and low-humidity conditions. The value of hardness of the base layer is preferably at least 2° larger than the value of hardness of the edge layer, and is more preferably at least 5° larger than the value of hardness of the edge layer.

A rebound resilience of lower than 40% of the base layer in the first cleaning blade does not contribute to improvement of the cleaning ability. On the other hand, a rebound resilience of higher than 70% destabilizes nipping of the edge. The rebound resilience of the base layer is preferably from 45 to 70%, and more preferably from 50 to 70%.

The 200% modulus of the base layer in the first cleaning blade at 23° C. is preferably within the range of 3.5 to 12 MPa. If the 200% modulus of the base layer is lower than 3.5 MPa, buckling may possibly be caused easily. On the other hand, if the 200% modulus of the base layer is higher than 12 MPa, the level of the stress generated near the edge may be raised and thus the abrasion resistance may possibly be decreased. The 200% modulus of the base layer is more preferably from 3.5 to 8.0 MPa, and even more preferably from 4.0 to 7.0 MPa.

The elastic rubber member in the first cleaning blade preferably has a thickness ratio (a/(a+b)) of 0.05 to 0.5, which is a ratio of a thickness (a) of the edge layer to a sum (a+b) of the thickness (a) of the edge layer and a thickness (b) of the base layer. Such a ratio can lead to achievement of both sufficient abrasion resistance and sufficient cleaning ability (particularly under low-temperature and low-humidity conditions). The thickness ratio is more preferably from 0.05 to 0.25.

The thickness (a) of the edge layer in the first cleaning blade is preferably more than 50 and is more preferably from 0.2 to 2.0 mm. Such a thickness can lead to achievement of both sufficient abrasion resistance and sufficient cleaning ability (particularly under low-temperature and low-humidity conditions). The thickness of the edge layer is even more preferably from 0.2 to 1.2 mm.

The edge layer in the elastic rubber member (structure (B)) of the second cleaning blade is made of a material with a JIS-A hardness of 65° to 72° at 23° C., a rebound resilience of 37 to 60%, and a 200% modulus of 3 to 8 MPa at 23° C. Further, the base layer in the elastic rubber member of the second cleaning blade is made of a material with a JIS-A hardness of 65° to 70° at 23° C. and a rebound resilience of 5 to 30%. Sufficient abrasion resistance and sufficient cleaning ability (particularly under low-temperature and low-humidity conditions) both can be achieved by providing an elastic rubber member having a double layer structure that includes the edge layer with hardness, rebound resilience, and a modulus which fall within the respective specific ranges, and includes the base layer with hardness and rebound resilience which fall within the respective specific ranges.

The second cleaning blade can exert the above effects such as the stress distribution and damper effects so as to achieve both sufficient abrasion resistance and sufficient cleaning ability (particularly under low-temperature and low-humidity conditions), when provided with all the following characteristics: (i) the edge layer has a hardness of within the above specific range; (ii) the edge layer has a rebound resilience of within the above specific range; (iii) the edge layer has a modulus of within the above specific range; (iv) the base layer has a hardness of within the above specific range; and (v) the base layer has a rebound resilience of within the above specific range. That is, even in the case where the first cleaning blade lacks only any one of the characteristics (i) to (v), both sufficient abrasion resistance and sufficient cleaning ability are difficult to achieve. Provision of an elastic rubber member simply having a double layer structure is not enough to achieve the above objects. It is thus highly important that the second cleaning blade be provided with all the characteristics (i) to (v).

If the edge layer in the second cleaning blade has a hardness of lower than 65°, the nip width of the edge gets widened to decrease the blade's capacity of preventing the passing of the toner particles. On the other hand, if the edge layer has a hardness of higher than 72°, the abrasion resistance is decreased because of the above reason. The hardness of the edge layer is preferably from 65° to 70°, and more preferably from 65° to 68°.

If the edge layer in the second cleaning blade has a rebound resilience of lower than 37%, the cleaning ability under low-temperature and low-humidity conditions is decreased. On the other hand, if the edge layer has a rebound resilience of higher than 60%, the abrasion resistance is decreased because of the above reason. The rebound resilience of the edge layer is preferably from 37 to 50%, and more preferably from 37 to 45%.

If the 200% modulus of the edge layer in the second cleaning blade is lower than 3 MPa, the edge is greatly deformed and thus the abrasion resistance is decreased. On the other hand, if the 200% modulus of the edge layer is higher than 8 MPa, the stress generated near the edge is not allowed to be distributed and thus the abrasion resistance is decreased. The 200% modulus of the edge layer is preferably from 3.5 to 7.0 MPa, and more preferably from 3.5 to 6.0 MPa.

If the base layer in the second cleaning blade has a hardness of lower than 65°, buckling tends to be easily caused upon straining of the edge. On the other hand, if the base layer has a hardness of higher than 70°, the effects of suppression of the stress exerted on the edge are reduced. The hardness of the base layer is preferably from 65° to 68°.

A rebound resilience of lower than 5% of the base layer in the second cleaning blade impairs the cleaning ability under low-temperature and low-humidity conditions. On the other hand, a rebound resilience of higher than 30% reduces damper effects. The rebound resilience of the base layer is preferably from 8 to 26%, and more preferably from 10 to 20%.

The 200% modulus of the base layer in the second cleaning blade at 23° C. is preferably within the range of 3.5 to 12 MPa. If the 200% modulus of the base layer is lower than 3.5 MPa, buckling may possibly be caused easily. On the other hand, if the 200% modulus of the base layer is higher than 12 MPa, damper effects may possibly be reduced. The 200% modulus of the base layer is more preferably from 4.0 to 10 MPa, and even more preferably from 4 to 8 MPa.

The elastic rubber member in the second cleaning blade preferably has a thickness ratio (a/(a+b)) of 0.05 to 0.75, which is a ratio of a thickness (a) of the edge layer to a sum (a+b) of the thickness (a) of the edge layer and a thickness (b) of the base layer. Such a ratio can lead to achievement of both sufficient abrasion resistance and sufficient cleaning ability (particularly under low-temperature and low-humidity conditions). The thickness ratio is more preferably from 0.25 to 0.75.

The thickness (a) of the edge layer in the second cleaning blade is preferably more than 50 μm, and is more preferably from 0.2 to 2.0 mm. Such a thickness can lead to achievement of both sufficient abrasion resistance and sufficient cleaning ability (particularly under low-temperature and low-humidity conditions). The thickness of the edge layer is even more preferably from 0.45 to 1.60 mm.

The JIS-A hardness herein is a value that is measured by a spring-type hardness tester (type A), based on JIS K 7312. Further, the rebound resilience is a value that is measured based on the rebound resilience test of JIS K 7312. Furthermore, the 200% modulus is a value that is measured based on JIS K 6251 (predetermined tensile stress-strain (Mn)). Test specimens used are of a No. 3 dumbbell specimen.

The edge layer and the base layer each having the aforementioned hardness, rebound resilience, and 200% modulus in the first and second aspects of the present invention can be produced by appropriately selecting materials that form the edge layer and the base layer.

More specifically, the first cleaning blade can be produced by, for example, the following methods.

The edge layer in the first cleaning blade is to have low hardness and low rebound resilience (hardness: 65° to 72°, rebound resilience: 10 to 35%). For the edge layer, the degree of hardness can be decreased by, in designing of the proportion of ingredients, decreasing the NCO amount in the prepolymer, and additionally decreasing the 1,4-butanediol (BD) proportion in the crosslinking agent as necessary so as to suppress the formation of a hard segment that includes—(MDI-BD)—unit. Further, the degree of rebound resilience can be decreased by increasing the trimethylolpropane proportion in the crosslinking agent to increase the number of chemical crosslinking points and achieve a high Tg (glass transition temperature).

The base layer in the first cleaning blade is to have high hardness and high rebound resilience (hardness: 70° to 80°, rebound resilience: 40 to 70%). For the base layer, the degree of rebound resilience can be increased by, in designing of the proportion of ingredients, selecting a polycaprolactone polyol (which has a low ester group concentration) as a polyol of the prepolymer to decrease the polarity, and thus to decrease the cohesive force by hydrogen bonding. Further, the degree of hardness can be increased by increasing the 1,4-butanediol (BD) proportion in the crosslinking agent, and additionally increasing the NCO amount in the prepolymer as necessary so as to accelerate the formation of a hard segment that includes—(MDI-BD)—unit.

Also, the second cleaning blade can be produced by, for example, the following methods.

The edge layer in the second cleaning blade is to have low hardness and high rebound resilience (hardness: 65° to 72°, rebound resilience: 37 to 60%). For the edge layer, such high rebound resilience can be achieved by the same method as that for the base layer in the first cleaning blade. Further, such low hardness can be achieved by the same method as that for the edge layer in the first cleaning blade. Furthermore, the 200% modulus of the edge layer can be set to 3 to 8 MPa by appropriately adjusting the equivalent ratio (NCO/OH) of the respective raw materials.

The base layer in the second cleaning blade is to have low hardness and low rebound resilience (hardness: 65° to 72°, rebound resilience: 5 to 30%). For the base layer, such low hardness and such low rebound resilience can be decreased by the same methods as those for the edge layer in the first cleaning blade.

Both of the edge layer and the base layer in the respective first and second cleaning blades are preferably made of a polyurethane. A polyurethane makes it possible to achieve both sufficient abrasion resistance and sufficient cleaning ability (particularly under low-temperature and low humidity conditions). Examples of the polyurethane forming the elastic rubber member include a polyurethane obtainable by a reaction of a polyol, polyisocyanate and, as necessary, a crosslinking agent.

The above polyol is not particularly limited, and examples thereof include polyester polyols, polyether polyols, and polycaprolactone polyols. Among these polyols, polyester polyols and polycaprolactone polyols are preferable since they can contribute to achievement of both sufficient abrasion resistance and sufficient cleaning ability (particularly under low-temperature and low-humidity conditions). For the second cleaning blade, the polycaprolactone polyols are particularly preferable. Each of these polyols may be used alone or in combination of two or more kinds thereof.

The number-average molecular weight of the polyol is preferably from 1000 to 3000. Use of a polyol with a molecular weight falling within the above range makes it possible to achieve both sufficient abrasion resistance and sufficient cleaning ability (particularly under low-temperature and low-humidity conditions).

Examples of the above polyester polyols include a polyester polyol obtainable by a reaction of a dicarboxylic acid and a glycol according to a conventional method.

Examples of the above dicarboxylic acid include aromatic dicarboxylic acids such as terephthalic acid, isophthalic acid, and 2,6-naphthalene dicarboxylic acid; aliphatic dicarboxylic acids such as adipic acid, azelaic acid, and sebacic acid; oxycarboxylic acids such as oxybenzoic acid; and ester-forming derivatives thereof. Examples of the glycol include aliphatic glycols such as ethylene glycol, 1,4-butanediol, diethylene glycol, neopentyl glycol, 3-methyl-1,5-pentanediol, 1,9-nonanediol, and triethylene glycol; alicyclic glycols such as 1,4-cyclohexane dimethanol; aromatic diols such as p-xylenediol; and polyoxyalkylene glycols such as polyethylene glycol, polypropylene glycol, and polytetramethylene glycol. Although a polyester polyol obtained from these has a linear structure, the polyester polyol may be a branched polyester that contains a trivalent or higher-valent ester-forming element. As the dicarboxylic acid, aliphatic dicarboxylic acids are preferable and adipic acid is particularly preferable because they can contribute to achievement of both sufficient abrasion resistance and sufficient cleaning ability (particularly under low-temperature and low-humidity conditions). As the glycol, aliphatic glycols are preferable and ethylene glycol and 1,4-butanediol are even more preferable.

Examples of the polyether polyols include polyalkylene glycols such as polyethylene glycol, polypropylene glycol, polytetramethylene glycol, and copolymers thereof.

Examples of the above polycaprolactone polyols include a polycaprolactone polyol obtainable by ring-opening addition polymerization of ε-caprolactone in the presence of a catalyst, with a low-molecular-weight glycol as an initiator. Preferable examples of the above low-molecular-weight glycol include divalent alcohols such as ethylene glycol, propylene glycol, 1,3-butylene glycol, and neopentyl glycol; and trivalent alcohols such as trimethylene glycol and glycerin. Preferable examples of the above catalyst include organic titanium compounds such as tetrabutyl titanate, tetrapropyl titanate, and tetraethyl titanate; and tin compounds such as tin octoate, dibutyltin oxide, dibutyltin laurate, stannic chloride, and stannic bromide. Another cyclic lactone such as trimethylcaprolactone and valerolactone, in addition to the above ϵ-caprolactone, may be partly mixed.

A particularly preferable embodiment of the first cleaning blade is that the edge layer is made of a polyurethane containing a polyol unit that is derived from a polycaprolactone polyol and/or a polyester polyol, and that the base layer is made of a polyurethane containing a polyol unit that is derived from a polycaprolactone polyol. Also, a particularly preferable embodiment of the second cleaning blade is that the edge layer is made of a polyurethane containing a polyol unit that is derived from a polycaprolactone polyol, and that the base layer is made of a polyurethane containing a polyol unit that is derived from a polyester polyol. These embodiments can contribute to achievement of both excellent abrasion resistance and excellent cleaning ability (particularly under low-temperature and low-humidity conditions). Further, in these embodiments, polyethylene adipate diol and polybutylene adipate diol are particularly preferable as the above polyester polyol.

The above polyisocyanate is not particularly limited, and a known polyisocyanate can be used. Examples of the polyisocyanate include aliphatic isocyanates, alicyclic isocyanates, and aromatic isocyanates. Among these polyisocyanates, aromatic isocyanates are preferable because they can contribute to achievement of both sufficient abrasion resistance and sufficient cleaning ability (particularly under low-temperature and low-humidity conditions).

Examples of the above aliphatic isocyanates include 1,6-hexamethylene diisocyanate (HDI), 2,2,4-trimethyl hexamethylene diisocyanate, and lysine diisocyanate. Further, examples thereof also include modified products such as isocyanurates, biurets, and adducts of hexamethylene diisocyanate and isophorone diisocyanate. Examples of the above alicyclic isocyanates include alicyclic diisocyanates such as isophorone diisocyanate (IPDI), 4,4'-dicyclohexylmethane diisocyanate, 1,4-cychlohexane diisocyanate, and norbornane diisocyanate (NBDI). Examples of the aromatic isocyanates include tolylene diisocyanate (TDI), phenylene diisocyanate, 4,4'-diphenylmethane diisocyanate (MDI), 1,5-naphthalene diisocyanate, xylylene diisocyanate (XDI), carbodiimide-modified MDIs, and urethane-modified MDIs. Among the above polyisocyanates, MDI and an urethane-modified MDI are preferable and MDI is particularly preferable because they can contribute to achievement of both sufficient abrasion resistance and sufficient cleaning ability (particularly under low-temperature and low-humidity conditions).

Examples of the crosslinking agent to be added as necessary in the polyurethanes include ethylene glycol, propylene glycol, butanediol, hexanediol, diethylene glycol, trimethylolpropane, glycerin, hydrazine, ethylenediamine, diethylenetriamine, 4,4'-diaminodiphenyl methane, 4,4'-diaminodicyclohexyl methane, N,N-bis(2-hydroxypropyl)aniline, and water. Among these crosslinking agents, ethylene glycol, 1,4-butanediol, trimethylolpropane, and N,N-bis(2-hydroxypropyl)aniline are preferable, and a combination of 1,4-butanediol and trimethylolpropane is particularly preferable because they can contribute to achievement of both sufficient abrasion resistance and sufficient cleaning ability (particularly under low-temperature and low-humidity conditions).

The above polyurethane can be produced from the above raw materials by a known method such as a method including adding a catalyst in an appropriate organic solvent as necessary, adjusting the equivalent ratio of the respective raw materials to NCO/OH=1.02 to 1.18, and then starting the reaction; a method including a solvent-free reaction in a melted state; or the like. Further, the polyurethane can also be produced by a method including simultaneously reacting all the raw materials, a prepolymer method, or the like.

The method of molding the elastic rubber member made of the polyurethane is not particularly limited. Examples of the method include normal-pressure cast molding, reduced-pressure cast molding, centrifugal molding, rotational molding, extrusion molding, injection molding, reaction injection molding (RIM), and spin coating. Among these methods, centrifugal molding is preferably employed as the molding method in production because it can contribute to achievement of both sufficient abrasion resistance and sufficient cleaning ability (particularly under low-temperature and low-humidity conditions).

The above supporting member has a function of supporting the elastic rubber member. The supporting member is not particularly limited, and a known one can be used. Examples thereof include supporting members produced from rigid metal, elastic metal, plastic, ceramic, or the like. Among the materials, rigid metal is preferable.

The above cleaning blade preferably has an adhesive layer. The adhesive layer is to be provided between the supporting member and the elastic rubber member, and has a function of bonding the members together. The adhesive layer can be formed by a technique of bonding with an EVA, polyamide or polyurethane hot-melt adhesive, a curing adhesive, or a double-sided adhesive tape; pinching with a sheet metal; or the like. Among these techniques, the technique of forming the adhesive layer with use of a hot-melt adhesive is preferable because it can contribute to achievement of both sufficient abrasion resistance and sufficient cleaning ability (particularly under low-temperature and low-humidity conditions).

[Method of Producing Cleaning Blade for Electrophotographic Device]

The method of producing the first and second cleaning blades is not particularly limited, and a known method of producing a blade with an elastic rubber member having a double layer structure can be employed in the production. However, the following method is preferably employed. The following method of producing a cleaning blade is also one aspect of the present invention.

The method of producing the first cleaning blade (hereinafter referred also to as a "first production method") employs centrifugal molding, and the method includes the steps of: (I) producing a silicone rubber molded body inside a mold; (II) producing a molded body that is to be an edge layer of an elastic rubber member, on the silicone rubber molded body produced in the step (I); and (III) producing a molded body that is to be a base layer of the elastic rubber member, on the molded body that is to be the edge layer which has been produced in the step (II), wherein the molded body to be the edge layer is made of a material with a JIS-A hardness of 65° to 72° at 23° C. and a rebound resilience of 10 to 35%, and the molded body to be the base layer is made of a material with a JIS-A hardness of 70° to 80° at 23° C. and a rebound resilience of 40 to 70%, the JIS-A hardness value being larger than the value of hardness of the edge layer.

The method of producing the second cleaning blade employs centrifugal molding, and the method includes the steps of: (I) producing a silicone rubber molded body inside a mold; (II) producing a molded body that is to be an edge layer of an elastic rubber member, on the silicone rubber molded body produced in the step (I); and (III) producing a molded body that is to be a base layer of the elastic rubber member, on the molded body that is to be the edge layer which has been produced in the step (II), wherein the molded body to be the edge layer is made of a material with a JIS-A hardness of 65° to 72° at 23° C., a rebound resilience of 37 to 60%, and a 200% modulus of 3 to 8 MPa at 23° C., and the molded body to be the base layer is made of a material with a JIS-A hardness of 65° to 70° at 23° C. and a rebound resilience of 5 to 30%.

The centrifugal molding is a molding method in which a thermosetting material is poured inside a heated, fast-spinning cylindrical mold so that a flat sheet is produced. FIG. 3 illustrates an exemplary schematic view of a centrifugal molding machine which is used in the above centrifugal molding; FIG. 3(a) is a vertical cross-sectional view, and FIG. 3(b) is a cross-sectional view along line A-A of FIG. 3(a). As illustrated in FIG. 3, the centrifugal molding machine has a bottomed cylindrical mold 31 inside a heat-insulating chamber 32 with a plurality of heaters 33 arranged on the inner wall thereof, and the mold 31 is pivotally supported by a rotating shaft 35. The front opening of the heat-insulating chamber 32 is opened or closed by a full door 34.

In a molded body produced by the centrifugal molding, the face on the inner side (hereinafter referred also to as an "air-side face") at the time of molding has a smooth, mirror-like surface, whereas the degree of surface smoothness of the face that has come into contact with the mold (hereinafter referred also to as a "mold-contacting face") reflects the degree of roughness of the inner surface of the mold. Hence, upon formation of an elastic-rubber-member material layer on the surface of the mold, the air-side face of the produced elastic rubber member usually becomes a working surface that is to be in contact with the partner material (a rotating body such as a photoreceptor). However, with this method, foreign matters such as air bubbles and dusts which get caught upon casting may be moved to the sheet surface on the inner side due to the centrifugal force and curing may occur in this state, whereby the surface conditions of the air-side face that is to be the working surface in the blade may be poor.

Further, in the conventional centrifugal molding, there is also a problem in which the thickness accuracy of the sheet to be produced (the difference between the maximum value and minimum value of the thickness in one molded sheet) depends on the runout accuracy of the mold in the centrifugal molding machine (the difference between the maximum value and minimum value of the distance from the central shaft of the mold to the inner surface of the mold at the time of mold rotation).

In contrast, FIG. 4 is an exemplary partially enlarged cross-sectional view which schematically illustrates the inside of a mold when the centrifugal molding is employed by the method of producing a cleaning blade according to the present invention (partially enlarged cross-sectional view of the portion B of FIG. 3). According to the method of the present invention, as illustrated in FIG. 4, a silicone rubber layer (silicone rubber molded body) 42 is produced on a mold 41, and then an edge layer 43 and a base layer 44, which are of the material layer, are sequentially produced thereon.

In this case, a mirror-like surface is formed on the air-side face of the silicone rubber layer 42 that has been firstly formed, and thus a silicone-rubber-contacting surface 43a of the subsequently formed edge layer 43 also becomes mirror-like. Accordingly, in the present invention, the silicone-rubber-contacting surface 43a of the edge layer 43 can be the working surface of the elastic rubber member. As a result, the poor surface condition problems caused by foreign matters such as air bubbles and dusts getting caught upon casting can be reduced and the productivity can be increased.

Also, since the silicone rubber is cured in a state where the runout of the mold 41 is absorbed, the silicone rubber layer 42 can have a mirror-like surface on the air-side face that is on the inner side, and have high runout accuracy. As a result, an elastic-rubber-member material layer 45 including the edge layer 43 and the base layer 44 can be produced which has a good thickness accuracy of 0.1 mm or less. The thickness accuracy is preferably 0.05 mm or less.

Further, according to the first production method, an elastic rubber member having a double layer structure that includes an edge layer and a base layer can be produced, each of the layers having hardness and rebound resilience of within the respective ranges. Furthermore, according to the second production method, an elastic rubber member can be produced that has a double layer structure including an edge layer with hardness, rebound resilience, and a modulus of within the respective specific ranges, and including a base layer with hardness and rebound resilience of within the respective specific ranges. Therefore, use of the cleaning blades produced by the first and second production methods can contribute to achievement of both sufficient abrasion resistance and sufficient cleaning ability (particularly under low-temperature and low-humidity conditions) even when the polymerized toner is used.

The first and second production methods each employ centrifugal molding in which a process of producing a silicone rubber molded body inside a mold of a centrifugal molding machine is carried out first (step (I)). As a molding machine or a mold for use in the centrifugal molding, known ones as illustrated in FIG. 3 can be used. The silicone rubber molded body can be produced by, for example, pouring a thermosetting material, which is to form the silicone rubber molded body, into a heated, fast-spinning cylindrical mold, and then heating and curing the material.

As illustrated in FIG. 4, the silicone rubber layer 42 (flat molded-body sheet of silicone rubber) is formed on the inner surface of the mold through step (I). The silicone rubber molded body has excellent mold releasability, and thus the elastic-rubber-member material layer 45 to be formed thereon can be easily released without a mold-release agent.

The silicone rubber molded body in the above step (I) is preferably produced from an addition curable silicone rubber composition. Preferable addition curable silicone rubber compositions include an addition curable silicone rubber composition that contains an organopolysiloxane with at least two unsaturated aliphatic hydrocarbon groups bonded to a silicon atom; an organohydrogen polysiloxane with at least two hydrogen atoms bonded to a silicon atom; and a platinum-based catalyst. In this case, a silicone rubber molded body with high runout accuracy is formed, and an elastic rubber member with good thickness accuracy can be produced. Also, the poor surface conditions of the edge layer of the elastic rubber member can be improved. Further, the produced cleaning blade can achieve both sufficient abrasion resistance and sufficient cleaning ability (particularly under low-temperature and low-humidity conditions). Furthermore, when a composition without an organic solvent added thereto is used, the health of the workers is not damaged and good hygienic conditions can be maintained in the working environment.

The organopolysiloxane with at least two unsaturated aliphatic hydrocarbon groups bonded to a silicon atom is preferably a component to be the base polymer in the addition curable silicone rubber composition, and a compound represented by an average composition formula (1): $R^1{}_a R^2{}_b SiO_{[4-(a+b)/2]}$. In the formula (1), the $R^1$ represents a monovalent unsaturated $C_{2-10}$ aliphatic hydrocarbon group. The number of carbons is preferably from 2 to 6. Preferable specific examples of the $R^1$ are alkenyl groups such as vinyl, allyl, propenyl, isopropenyl, butenyl, and isobutenyl; and a particularly preferable specific example is a vinyl group.

The $R^2$ represents a substituted or unsubstituted $C_{1-12}$ monovalent hydrocarbon group. The number of carbons is preferably from 1 to 8. However, the above unsaturated aliphatic hydrocarbon groups are excluded from the scope of the $R^2$. Specific examples of the $R^2$ include alkyl groups such as methyl, ethyl, propyl, isopropyl, butyl, isobutyl, tert-butyl, hexyl, cyclohexyl, and octyl; aryl groups such as phenyl and tolyl; aralkyl groups such as benzyl and phenylethyl; and functional groups in which all or part of hydrogen atoms in the aforementioned groups is substituted by a halogen atom including fluoride, chloride, and bromide, or by a cyano group, such as chloromethyl, bromoethyl, trifluoropropyl, and cyanoethyl. Among the examples, methyl, phenyl, and trifluoropropyl are preferable, and methyl is more preferable. It is preferable that 92% by mol or more of total $R^2$ be methyl, or that substantially 100% by mol of total $R^2$ be methyl. If solvent resistance is required, another functional group such as a 3,3,3-trifluoropropyl group can be appropriately used in combination in accordance with the required characteristics.

The above "a" and "b" each represent a numeral that satisfies the relationships $0<a\leq 1$, $1<b<3$, and $1<a+b<3$, and preferably represent a numeral that satisfies the relationships $0.0001 \leq a \leq 0.5$, $1.8 \leq b \leq 2.2$, and $1.8 \leq a+b \leq 2.25$. The organopolysiloxane represented by the formula (1) has, in one molecule, two or more of the unsaturated aliphatic hydrocarbon groups bonded to a silicon atom. The unsaturated aliphatic hydrocarbon groups may be bonded to a silicon atom at an end of the molecular chain or to any silicon atom in the molecular chain, or to the both of them. Among these, the organopolysiloxane represented by the above formula (1) may preferably be the one that has the unsaturated aliphatic hydrocarbon groups (preferable the alkenyl, and more preferably the vinyl) bonded to the silicon atom at each end of the molecular chain.

The organopolysiloxane may have any of the straight-chain structure, branched structure and ring structure. However, the main chain thereof preferably has a diorganosiloxane unit as the repeating unit, and has a triorganosiloxane unit at an end of the molecular chain. Examples of the triorganosiloxane unit (a triorganosiloxane with only a substituted or unsubstituted monovalent hydrocarbon group bonded to a silicon atom) include units without any vinyl groups, such as a trimethylsiloxane unit, dimethylphenylsiloxane unit, and a methyldiphenylsiloxane unit; and units with vinyl groups, such as a dimethylvinylsiloxane unit and a methylphenylvinylsiloxane unit. Among these units, a unit with a vinyl group is preferable.

The degree of polymerization (the number of Si atoms in a molecule) of the organopolysiloxane is preferably from 10 to 20000, and more preferably from 100 to 15000. If the degree is lower than 10, a cured material with sufficient mechanical strength (strength, elongation, hardness) might not be produced. On the other hand, if the degree is more than 15000, the flowability of the silicone rubber composition to be produced might be deteriorated.

The organohydrogen polysiloxane with at least two hydrogen atoms bonded to a silicon atom functions as a crosslinking agent of an organopolysiloxane by causing the hydrogen atom, which is bonded to the silicon atom, to addition-react (hydrosilylation) with an unsaturated aliphatic hydrocarbon group of the organopolysiloxane.

The organohydrogen polysiloxane is preferably a compound that is represented by an average composition formula (2): $R^3{}_c H_d SiO_{[4-(c+d)]/2}$. The $R^3$ represents the same group as the $R^2$. Among the groups, a substituted or unsubstituted $C_{1-4}$ monovalent hydrocarbon group is preferable. The alkyl is preferable in terms of easiness of polymerization and the cost. Methyl, ethyl, propyl, isopropyl, butyl, isobutyl, and tert-butyl are more preferable, and methyl is particularly preferable.

The above "c" and "d" each represent a numeral that satisfies the relationships $0.8 \leq c \leq 2.2$, $0.002 \leq d \leq 1$, and $0.8 < c+d < 3$, and preferably represent a numeral that satisfies the relationships $1 \leq c \leq 2.2$, $0.01 \leq d \leq 1$, and $1.8 \leq c+d \leq 2.5$. The organopolysiloxane represented by the formula (2) may have any of the straight-chain structure, branched structure and ring structure. Alternatively, the organopolysiloxane may be a resinous material with a three-dimensional mesh structure that has a diorganohydrogen siloxane unit and a $SiO_2$ unit, and appropriately has a triorganosiloxane unit and a diorganosiloxane unit.

The organohydrogen polysiloxane is a compound that has, in one molecule, at least two and preferably three hydrogen atoms bonded to a silicon atom to form a SiH group. In this case, the H atoms may be bonded to a Si atom at an end of the molecular chain or to any Si atom in the molecular chain, or to the both of them. Further, the degree of polymerization (the number of Si atoms in a molecule) of the organohydrogen polysiloxane is preferably from 3 to 400, and particularly preferably from 4 to 300.

Specific examples of the organohydrogen polysiloxane include methylhydrogencyclopolysiloxane; cyclic copolymers of methylhydrogensiloxane and dimethylsiloxane; methylhydrogenpolysiloxane both ends of which are blocked by trimethylsiloxy groups; copolymers of dimethylsiloxane and methylhydrogensiloxane both ends of which are blocked by trimethylsiloxy groups; dimethylpolysiloxane both ends of which are blocked by dimethylhydrogensiloxy groups; copolymers of dimethylsiloxane and methylhydrogensiloxane both ends of which are blocked by dimethylhydrogensiloxy groups; copolymers of methylhydrogensiloxane and diphenylsiloxane both ends of which are blocked by trimethylsiloxy groups; copolymers of methylhydrogensilxane, diphenylsiloxane, and dimethylsiloxane both ends of which are blocked by trimethylsiloxy groups; copolymers of methylhydrogensiloxane, dimethylsiloxane, and diphenylsiloxane both ends of which are blocked by dimethylhydrogensiloxy groups; copolymers consisting of $(CH_3)_2HSiO_{1/2}$ units, $(CH_3)_3SiO_{1/2}$ units, and $SiO_{4/2}$ units; copolymers consisting of $(CH_3)_2HSiO_{1/2}$ units and $SiO_{4/2}$ units; and copolymers consisting of $(CH_3)_2HSiO_{1/2}$ units, $SiO_{4/2}$ units, and $(C_6H_5)_3SiO_{1/2}$ units.

With respect to the compounding ratio of the organopolysiloxane to the organohydrogen polysiloxane in the addition curable silicone rubber composition, it is preferable that the compounding ratio of the unsaturated aliphatic hydrocarbon group in the organopolysiloxane to the hydrogen atom in the organohydrogen polysiloxane, in molar ratio, be from 1:10 to 10:1, and a compounding ratio of 1:3 to 3:1 is more preferable.

The platinum-based catalyst is a component that has a function of initiating addition reactions between the organopolysiloxane and the organohydrogen polysiloxane. Examples of the catalyst include platinum group metal compounds such as platinum, platinic chloride, chrloroplatinic acid, vinylsiloxane complexes thereof and alcohol-modified solutions thereof; rhodium compounds; and palladium compounds. The compounding amount of the platinum-based catalyst with respect to the organopolysiloxane is preferably from 0.1 to 1000 ppm, and more preferably from 1 to 500 ppm.

The addition curable silicone rubber composition may contain a reinforcing silica. The reinforcing silica is added to increase the strength characteristics, and examples thereof include fumed silicas, precipitated silicas, and fused silicas. The particle diameter thereof is preferably 20 µm or less. Further, the reinforcing silica may be preliminarily surface-treated by organosilane, organosiloxane, organosilazane, or the like, or may be reacted with one of the treating agents in the process. The reinforcing silica content is preferably from 5 to 200 parts by mass per 100 parts by mass of the organopolysiloxane.

The addition curable silicone rubber composition may also be a composition that contains a known reaction control agent such as an acetylene compound, a phosphor compound, a nitrile compound, a carboxylate, a tin compound, a mercury compound, and a sulfur compound.

Examples of commercial products of the addition curable silicone rubber composition include TSE3032 (produced by GE Toshiba Silicone Co., Ltd.) and KE103 (produced by Shin-Etsu Polymer Co., Ltd.).

In step (I), a silicone rubber molded body can be produced by, for example, pouring a material for forming a silicone rubber molded body such as the addition curable silicone rubber composition into a mold of a centrifugal molding machine preheated to 30 to 50° C., and then allowing the material to cure for 120 to 180 minutes.

The silicone rubber molded body (silicone rubber layer) to be formed in step (I) preferably has a thickness of 0.5 to 3 mm. If the thickness is less than 0.5 mm, the silicone rubber layer may have low strength attributed to its too small value of thickness, and not the entire layer may possibly be released neatly when the layer is released from the mold. If the thickness is more than 3 mm, the silicone rubber layer may not be able to effectively transfer the heat from the mold, and may cause adverse effects on the characteristics of the elastic-rubber-member material layer formed thereon.

The first and second production methods each include, after step (I), a step of producing a molded body that is to be the edge layer of the elastic rubber member, on the silicone rubber molded body produced in step (I) (step (II)). Further, the methods each include, after step (II), a step of producing a molded body that is to be the base layer of the elastic rubber member, on the molded body that is to be the edge layer which has been produced in step (II) (step (III)). Carrying out steps (II) and (III) with the centrifugal molding makes it possible to produce a good elastic rubber member that has a double layer structure with the edge layer and the base layer. Furthermore, the smooth silicone-rubber-contacting surface on the produced edge layer can be the working surface (the face in contact with the partner material), and thereby both sufficient abrasion resistance and sufficient cleaning ability (particularly under low-temperature and low-humidity conditions) can be achieved.

In the first and second production methods, the materials of the respective molded bodies to be the edge layer and the base layer are similar to the materials of the edge layer and the base layer. The respective molded bodies to be the edge layer and the base layer are both preferably made of a polyurethane because it can contribute to achievement of both sufficient abrasion resistance and sufficient cleaning ability (particularly under low-temperature and low-humidity conditions).

The method which employs the centrifugal molding to produce the molded body that is to be the edge layer in step (II) and then to produce the molded body that is to be the base layer in step (III) can be carried out by a known method of forming an elastic-rubber-member material layer with a double layer structure. In the case of production of an elastic rubber member in which the molded bodies to be the edge layer and the base layer are both made of a polyurethane, steps (II) and (III) can be carried out by, for example, the following methods.

In step (II), after preheating of the centrifugal molding machine up to 130 to 150° C., a material for the edge layer is poured onto the silicone rubber molded body inside the mold of the centrifugal molding machine which has been produced in step (I), and is then cured for 5 to 10 minutes. Next, after the curing reaction in step (II), a material for the base layer is poured onto the cured edge layer and is cured for 25 to 50 minutes in step (III). Thereafter, a sheet body for the elastic rubber member having a double layer structure is removed from the silicone rubber molded body and taken out of the mold, so that a cylindrical sheet body having a thickness of 1 to 3 mm can be produced. The produced sheet body is cut into rectangular pieces each having a width of 8 to 20 mm and a length of 220 to 500 mm, whereby the elastic rubber member can be produced.

In the first and second production methods, the molded bodies to be the edge layer and the base layer can be produced through a prepolymer process, a one-shot process, or the like.

In the case where the prepolymer process is employed, the cured edge layer and base layer can be produced by the following method or the like; the method includes adding a crosslinking agent and the like to a prepolymer, which can be produced by mixing a dehydrated polyol and an isocyanate and then causing a reaction between them for 10 to 600 minutes at a temperature of 50 to 80° C., and then pouring the mixture into a mold to cure the mixture. In the case where the one-shot process is employed, the cured edge layer and base layer can be produced by the following method or the like; the method includes weighing a dehydrated polyol and a crosslinking agent, adding a polyisocyanate thereto to weigh and mix the materials, pouring the mixture into a mold, and then curing the mixture.

In the first and second production methods, step (IV) of bonding the produced elastic rubber member and the supporting member is generally carried out after the production of the elastic rubber with a double layer structure. Step (IV) can be carried out by a known method such as a method of bonding the members by the above adhesive agent. In step (IV), the supporting member is similar to the aforementioned supporting member. Accordingly, the cleaning blade of the present invention illustrated in FIG. 2 can be produced.

The cleaning blade of the present invention has the above structure, and therefore can achieve both sufficient abrasion resistance and sufficient cleaning ability (particularly cleaning ability under low-temperature and low-humidity conditions) which used to be difficult to achieve, even when spherical (perfectly spherical or irregularly shaped), polymerized toner with a small particle diameter is used. Further, the production method of the present invention has the above steps, and thus can reduce the poor conditions on the surface of the edge layer and improve the productivity. Furthermore, an elastic rubber member with a double layer structure having good thickness accuracy can be produced.

BEST MODE FOR CARRYING OUT THE INVENTION

Although a more detailed description of the present invention will be given with Examples, the present invention is not limited to those Examples. In the Examples, "parts" and "%" respectively mean "parts by mass" and "% by mass" unless otherwise stated.

Examples 1 to 10 and Comparative Examples 1 to 10

Production of Cleaning Blade (First Cleaning Blade)

(Formation of Silicone Rubber Layer)

A molding drum (internal diameter: 700 mm, depth: 500 mm, runout accuracy at a normal temperature: 0.06 mm, rotational speed in molding: 800 rpm, rough surface condition: Ra=0.30) of a centrifugal molding device which has a structure as illustrated in FIG. 3 was heated up to 40° C. Then, as the silicone rubber material, a liquid mixture (compounding ratio: 10:1) of addition curable silicone rubber compositions "TSE 3032(A)" (base, produced by GE Toshiba Silicone Co., Ltd.) and "TSE 3032(B)" (curing agent), the compositions being cured by an addition reaction, was poured into the molding drum and then heated and cured for 120 minutes, so that a silicone rubber layer was formed. The produced silicone rubber layer had an air-side face with a uniform mirror-like surface, and the thickness thereof was 0.7 mm.

(Formation of Elastic-Rubber-Member Material Layer)

A material for an edge layer was poured onto the silicone rubber layer inside the mold of the centrifugal molding machine preheated up to 140° C. and was allowed to cure for 10 minutes. After the curing reaction, a material for a base layer was poured onto the cured edge layer and was allowed to cure for 30 minutes. After the curing reaction, only a sheet body for an elastic rubber member with a double layer structure was taken out of the mold, and thus a cylindrical double-layer sheet body with a predetermined thickness was produced. The sheet body was cut into rectangular pieces each having a width of 12 mm and a length of 330 mm so as to produce elastic rubber members. The produced elastic rubber members had a good thickness accuracy of 0.045 mm. Further, the surface conditions of the edge layer (silicone-rubber-contacting surface) of each elastic rubber member were mirror-like, and no defect was found.

Then, the produced elastic rubber member was bonded to a supporting member made of coated steel by a polyurethane hot-melt adhesive so that a cleaning blade was produced.

Since the cleaning blades in Comparative Examples 1 to 3 each had an elastic rubber member with a single layer structure, the step of pouring the material for the base layer into the centrifugal molding machine and allowing it to cure was omitted.

Tables 1 and 2 each show the materials used for the edge layer, the materials used for the base layer, the thickness (a) of the edge layer, the thickness (b) of the base layer, the thickness ratio a/(a+b), hardness (23° C.), a 200% modulus (23° C.), and rebound resilience. The hardness, the 200% modulus (23° C.), and the rebound resilience of the edge layer and the base layer are values measured by the above methods.

The polyurethanes in Tables 1 and 2 were produced from the ingredients shown in Table 3.

Examples 11 to 20 and Comparative Examples 11 to 21

Production of Cleaning Blade (Second Cleaning Blade)

Cleaning blades were produced in the same way as in the above Examples and Comparative Examples except that the materials used for the edge layer, the materials used for the base layer, the thickness (a) of the edge layer, the thickness (b) of the base layer, the thickness ratio a/(a+b), the hardness (23° C.), the 200% modulus (23° C.), and the rebound resilience were changed as shown in Tables 4 to 5.

Further, the polyurethanes in Tables 4 and 5 were produced from the ingredients shown in Table 6.

In those examples, the produced elastic rubber members had a good thickness accuracy of 0.045 mm. Further, the surface conditions of the edge layer (silicone-rubber-contacting surface) of each elastic rubber member were mirror-like, and no defect was found.

In the production of the above cleaning blades, the method of pouring the respective polyurethane materials (polyurethanes from "a" to "n" and from A to Q) as the material for the edge layer and the material for the base layer into the mold is described below.

A crosslinking agent was added to a prepolymer produced by mixing a dehydrated polyol and an isocyanate and allowing them to react for 240 minutes at a temperature of 70° C., and the mixture was poured into the mold (prepolymer process).

(Printing Test)

The cleaning blades produced in Examples and Comparative Examples were each mounted on a commercially available plain paper copier (using an organic photoreceptor, printing speed: 10 sheets/minute) to carry out the printing tests. The blades were tested under the respective conditions of (1) a temperature of 23° C. and a humidity of 50%, and (2) a temperature of 10° C. and a humidity of 15%. In the printing test was checked whether or not the toner particles passed under the cleaning blade, every time 100 sheets were printed. The test was ended when a streak attributed to passing of the toner particles was observed on the printed materials, and the number of the printed materials at this time was recorded. Otherwise, in the condition (1), the test was ended when no streak was observed on the sheets after printing of 150,000 sheets. In the condition (2), the test was ended when no streak was observed after printing of 30,000 sheets. The test results are shown in Tables 1 and 2, and Tables 4 and 5. Also, weight-average particle diameters and shapes of the used toner are shown in Tables 1 and 2, and Tables 4 and 5.

TABLE 1

|  |  | Example 1 | Example 2 | Example 3 | Example 4 | Example 5 |
|---|---|---|---|---|---|---|
| Edge layer | Polyurethane | a | a | a | a | b |
|  | Hardness (Hs) | 65 | 65 | 65 | 65 | 65 |
|  | 200% modulus (MPa) | 6.9 | 6.9 | 6.9 | 6.9 | 3.9 |
|  | Rebound resilience (%) | 15 | 15 | 15 | 15 | 27 |
|  | Thickness (a) (mm) | 0.5 | 0.5 | 1 | 0.3 | 0.5 |

TABLE 1-continued

|  |  | | | | | |
|---|---|---|---|---|---|---|
| Base layer | Polyurethane | c | d | l | c | c |
|  | Hardness (Hs) | 70 | 77 | 78 | 70 | 70 |
|  | 200% modulus (MPa) | 4.8 | 10.4 | 11.8 | 4.8 | 4.8 |
|  | Rebound resilience (%) | 70 | 45 | 50 | 70 | 70 |
|  | Thickness (b) (mm) | 1.5 | 1.5 | 1 | 2.7 | 1.5 |
| Layer-thickness ratio | a/(a + b) | 0.250 | 0.250 | 0.500 | 0.100 | 0.250 |
| Toner | Weight-average particle diameter (μm) | 8 | 6 | 6 | 8 | 8 |
|  | Shape | Perfectly spherical | Irregularly shaped | Irregularly shaped | Perfectly spherical | Perfectly spherical |
| Printing test | 23° C. 50% Number of printouts | 150,000 | 150,000 | 150,000 | 150,000 | 150,000 |
|  | Passing of toner | Not observed | Not observed | Not observed | Not observed | Not observed |
|  | 10° C. 15% Number of printouts | 30,000 | 30,000 | 30,000 | 30,000 | 30,000 |
|  | Passing of toner | Not observed | Not observed | Not observed | Not observed | Not observed |

|  |  | Example 6 | Example 7 | Example 8 | Example 9 | Example 10 |
|---|---|---|---|---|---|---|
| Edge layer | Polyurethane | a | i | j | k | i |
|  | Hardness (Hs) | 65 | 70 | 68 | 72 | 70 |
|  | 200% modulus (MPa) | 6.9 | 6.3 | 6.0 | 11.3 | 6.3 |
|  | Rebound resilience (%) | 15 | 33 | 26 | 10 | 33 |
|  | Thickness (a) (mm) | 0.3 | 0.5 | 0.5 | 0.5 | 0.5 |
| Base layer | Polyurethane | f | f | c | d | n |
|  | Hardness (Hs) | 73 | 73 | 70 | 77 | 71 |
|  | 200% modulus (MPa) | 5.3 | 5.3 | 4.8 | 10.4 | 6.5 |
|  | Rebound resilience (%) | 54 | 54 | 70 | 45 | 41 |
|  | Thickness (b) (mm) | 2.2 | 1.5 | 1.5 | 1.5 | 1.5 |
| Layer-thickness ratio | a/(a + b) | 0.120 | 0.250 | 0.250 | 0.250 | 0.250 |
| Toner | Weight-average particle diameter (μm) | 8 | 6 | 6 | 8 | 8 |
|  | Shape | Perfectly spherical | Irregularly shaped | Irregularly shaped | Perfectly spherical | Irregularly shaped |
| Printing test | 23° C. 50% Number of printouts | 150,000 | 150,000 | 150,000 | 150,000 | 150,000 |
|  | Passing of toner | Not observed | Not observed | Not observed | Not observed | Not observed |
|  | 10° C. 15% Number of printouts | 30,000 | 30,000 | 30,000 | 30,000 | 30,000 |
|  | Passing of toner | Not observed | Not observed | Not observed | Not observed | Not observed |

TABLE 2

|  |  | Comparative Example 1 | Comparative Example 2 | Comparative Example 3 | Comparative Example 4 | Comparative Example 5 |
|---|---|---|---|---|---|---|
| Edge layer | Polyurethane | c | d | a | e | a |
|  | Hardness (Hs) | 70 | 77 | 65 | 62 | 65 |
|  | 200% modulus (MPa) | 4.8 | 10.4 | 6.9 | 4.4 | 6.9 |
|  | Rebound resilience (%) | 70 | 45 | 15 | 32 | 15 |
|  | Thickness (a) (mm) | 2 | 2 | 2 | 0.3 | 0.5 |
| Base layer | Polyurethane | — | — | — | g | h |
|  | Hardness (Hs) | — | — | — | 70 | 81 |
|  | 200% modulus (MPa) | — | — | — | 9.8 | 23.2 |
|  | Rebound resilience (%) | — | — | — | 8 | 11 |
|  | Thickness (b) (mm) | — | — | — | 1.7 | 1.5 |
| Layer-thickness ratio | a/(a + b) | 1.000 | 1.000 | 1.000 | 0.150 | 0.250 |
| Toner | Weight-average particle diameter (μm) | 8 | 8 | 6 | 6 | 6 |
|  | Shape | Perfectly spherical | Perfectly spherical | Irregularly shaped | Irregularly shaped | Irregularly shaped |
| Printing test | 23° C. 50% Number of printouts | 40,000 | 50,000 | 140,000 | 1,000 | 150,000 |
|  | Passing of toner | Observed | Observed | Observed | Observed | Not observed |
|  | 10° C. 15% Number of printouts | 10,000 | 25,000 | 5 | 5 | 2 |
|  | Passing of toner | Observed | Observed | Observed | Observed | Observed |

|  |  | Comparative Example 6 | Comparative Example 7 | Comparative Example 8 | Comparative Example 9 | Comparative Example 10 |
|---|---|---|---|---|---|---|
| Edge layer | Polyurethane | d | g | m | f | a |
|  | Hardness (Hs) | 77 | 70 | 65 | 73 | 65 |
|  | 200% modulus (MPa) | 10.4 | 9.8 | 4.3 | 5.3 | 6.9 |
|  | Rebound resilience (%) | 45 | 8 | 37 | 54 | 15 |
|  | Thickness (a) (mm) | 0.5 | 0.5 | 0.5 | 0.5 | 0.5 |

TABLE 2-continued

| | | | | | | |
|---|---|---|---|---|---|---|
| Base layer | Polyurethane | c | d | d | d | m |
| | Hardness (Hs) | 70 | 77 | 77 | 77 | 65 |
| | 200% modulus (MPa) | 4.8 | 10.4 | 10.4 | 10.4 | 4.3 |
| | Rebound resilience (%) | 70 | 45 | 45 | 45 | 37 |
| | Thickness (b) (mm) | 1.5 | 1.5 | 1.5 | 1.5 | 1.5 |
| Layer-thickness ratio | a/(a + b) | 0.250 | 0.250 | 0.250 | 0.250 | 0.250 |
| Toner | Weight-average particle diameter (μm) | 8 | 6 | 8 | 8 | 8 |
| | Shape | Perfectly spherical | Perfectly spherical | Perfectly spherical | Perfectly spherical | Perfectly spherical |
| Printing test | 23° C. Number of printouts | 70,000 | 100,000 | 140,000 | 60,000 | 150,000 |
| | 50% Passing of toner | Observed | Observed | Observed | Observed | Not observed |
| | 10° C. Number of printouts | 30,000 | 20,000 | 30,000 | 26,000 | 50 |
| | 15% Passing of toner | Observed | Observed | Not observed | Observed | Observed |

TABLE 3

| | | Prepolymer | | | | | |
|---|---|---|---|---|---|---|---|
| Polyurethane | Polyol | Number-average molecular weight | Isocyanate | NCO content (%) | Parts by mass | Crosslinking agent 1,4-butanediol/ trimethylolpropane | Parts by mass |
| a | polyethylene adipate diol | 2000 | 4,4'-diphenylmethane diisocyanate | 6.7 | 100 | 60/40 | 6.05 |
| b | polycaprolactone polyol | 2000 | 4,4'-diphenylmethane diisocyanate | 6.7 | 100 | 60/40 | 6.46 |
| c | polycaprolactone polyol | 2000 | 4,4'-diphenylmethane diisocyanate | 5.5 | 100 | 80/20 | 5.11 |
| d | polycaprolactone polyol | 2000 | 4,4'-diphenylmethane diisocyanate | 8.0 | 100 | 90/10 | 7.80 |
| e | Polyethylene butylene adipate diol | 2000 363.64 Parts by mass | Urethane-modified MDI (Polyisocyanate) | 31.0 100 Parts by mass | — | N,N-bis(2-hydroxypropyl) aniline | 36.36 |
| f | polycaprolactone polyol | 2000 | 4,4'-diphenylmethane diisocyanate | 6.7 | 100 | 82/18 | 6.46 |
| g | polyethylene adipate diol | 2000 | 4,4'-diphenylmethane diisocyanate | 8.5 | 100 | 70/30 | 8.39 |
| h | polyethylene adipate diol | 2000 | 4,4'-diphenylmethane diisocyanate | 10.0 | 100 | 80/20 | 9.79 |
| i | polycaprolactone polyol | 2000 | 4,4'-diphenylmethane diisocyanate | 7.5 | 100 | 72/28 | 6.75 |
| j | polycaprolactone polyol | 2000 | 4,4'-diphenylmethane diisocyanate | 7.1 | 100 | 67/33 | 6.38 |
| k | polyethylene adipate diol | 2000 | 4,4'-diphenylmethane diisocyanate | 8.5 | 100 | 72/28 | 8.42 |
| l | polycaprolactone polyol | 2000 | 4,4'-diphenylmethane diisocyanate | 8.0 | 100 | 95/5 | 7.81 |
| m | polycaprolactone polyol | 2000 | 4,4'-diphenylmethane diisocyanate | 6.7 | 100 | 60/40 | 6.82 |
| n | polycaprolactone polyol | 2000 | 4,4'-diphenylmethane diisocyanate | 6.7 | 100 | 75/25 | 6.82 |

TABLE 4

| | | Example 11 | Example 12 | Example 13 | Example 14 | Example 15 |
|---|---|---|---|---|---|---|
| Edge layer | Polyurethane | A | A | B | A | B |
| | Hardness (Hs) | 65 | 65 | 65 | 65 | 65 |
| | 200% modulus (MPa) | 4.3 | 4.3 | 3.9 | 4.3 | 3.9 |
| | Rebound resilience (%) | 37 | 37 | 45 | 37 | 45 |
| | Thickness (a) (mm) | 0.5 | 1.5 | 0.5 | 0.5 | 0.5 |
| Base layer | Polyurethane | C | C | C | D | E |
| | Hardness (Hs) | 65 | 65 | 65 | 65 | 70 |
| | 200% modulus (MPa) | 6.9 | 6.9 | 6.9 | 4.4 | 9.8 |
| | Rebound resilience (%) | 15 | 15 | 15 | 26 | 8 |
| | Thickness (b) (mm) | 1.5 | 0.5 | 1.5 | 1.5 | 1.5 |
| Layer-thickness ratio | a/(a + b) | 0.250 | 0.750 | 0.250 | 0.250 | 0.250 |
| Toner | Weight-average particle diameter (μm) | 8 | 6 | 6 | 8 | 8 |
| | Shape | Perfectly spherical | Irregularly shaped | Irregularly shaped | Perfectly spherical | Perfectly spherical |
| Printing test | 23° C. Number of printouts | 150,000 | 150,000 | 150,000 | 150,000 | 150,000 |
| | 50% Passing of toner | Not observed | Not observed | Not observed | Not observed | Not observed |
| | 10° C. Number of printouts | 30,000 | 30,000 | 30,000 | 30,000 | 30,000 |
| | 15% Passing of toner | Not observed | Not observed | Not observed | Not observed | Not observed |

TABLE 4-continued

|  |  | Example 16 | Example 17 | Example 18 | Example 19 | Example 20 |
|---|---|---|---|---|---|---|
| Edge layer | Polyurethane | G | I | N | O | N |
|  | Hardness (Hs) | 70 | 68 | 68 | 72 | 68 |
|  | 200% modulus (MPa) | 4.9 | 6.1 | 4.8 | 6.9 | 4.8 |
|  | Rebound resilience (%) | 50 | 40 | 55 | 45 | 55 |
|  | Thickness (a) (mm) | 0.5 | 0.5 | 0.5 | 0.5 | 0.5 |
| Base layer | Polyurethane | E | D | C | C | Q |
|  | Hardness (Hs) | 70 | 65 | 65 | 65 | 69 |
|  | 200% modulus (MPa) | 9.8 | 4.4 | 6.9 | 6.9 | 6.1 |
|  | Rebound resilience (%) | 8 | 26 | 15 | 15 | 29 |
|  | Thickness (b) (mm) | 1.5 | 1.5 | 1.5 | 1.5 | 1.5 |
| Layer-thickness ratio | a/(a + b) | 0.250 | 0.250 | 0.250 | 0.250 | 0.250 |
| Toner | Weight-average particle diameter (μm) | 8 | 8 | 6 | 6 | 6 |
|  | Shape | Perfectly spherical | Perfectly spherical | Irregularly shaped | Perfectly spherical | Perfectly spherical |
| Printing test | 23° C. 50% Number of printouts | 150,000 | 150,000 | 150,000 | 150,000 | 150,000 |
|  | Passing of toner | Not observed | Not observed | Not observed | Not observed | Not observed |
|  | 10° C. 15% Number of printouts | 30,000 | 30,000 | 30,000 | 30,000 | 30,000 |
|  | Passing of toner | Not observed | Not observed | Not observed | Not observed | Not observed |

TABLE 5

|  |  | Comparative Example 11 | Comparative Example 12 | Comparative Example 13 | Comparative Example 14 | Comparative Example 15 | Comparative Example 16 |
|---|---|---|---|---|---|---|---|
| Edge layer | Polyurethane | A | H | A | A | C | H |
|  | Hardness (Hs) | 65 | 77 | 65 | 65 | 65 | 77 |
|  | 200% modulus (MPa) | 4.3 | 10.4 | 4.3 | 4.3 | 6.9 | 10.4 |
|  | Rebound resilience (%) | 37 | 45 | 37 | 37 | 15 | 45 |
|  | Thickness (a) (mm) | 2 | 2 | 0.5 | 0.5 | 0.5 | 0.5 |
| Base layer | Polyurethane | — | — | B | F | D | C |
|  | Hardness (Hs) | — | — | 65 | 81 | 65 | 65 |
|  | 200% modulus (MPa) | — | — | 3.9 | 23.2 | 4.4 | 6.9 |
|  | Rebound resilience (%) | — | — | 45 | 11 | 26 | 15 |
|  | Thickness (b) (mm) | — | — | 1.5 | 1.5 | 1.5 | 1.5 |
| Layer-thickness ratio | a/(a + b) | 1.000 | 1.000 | 0.250 | 0.250 | 0.250 | 0.250 |
| Toner | Weight-average particle diameter (μm) | 8 | 8 | 6 | 6 | 8 | 8 |
|  | Shape | Perfectly spherical | Perfectly spherical | Irregularly shaped | Irregularly shaped | Perfectly spherical | Perfectly spherical |
| Printing test | 23° C. 50% Number of printouts | 100,000 | 50,000 | 90,000 | 150,000 | 150,000 | 80,000 |
|  | Passing of toner | Observed | Observed | Observed | Not observed | Not observed | Observed |
|  | 10° C. 15% Number of printouts | 25,000 | 25,000 | 23,000 | 5,000 | 5 | 30,000 |
|  | Passing of toner | Observed | Observed | Observed | Observed | Observed | Not observed |

|  |  | Comparative Example 17 | Comparative Example 18 | Comparative Example 19 | Comparative Example 20 | Comparative Example 21 |
|---|---|---|---|---|---|---|
| Edge layer | Polyurethane | J | K | L | M | A |
|  | Hardness (Hs) | 73 | 73 | 70 | 62 | 65 |
|  | 200% modulus (MPa) | 5.3 | 6.7 | 4.8 | 4.4 | 4.3 |
|  | Rebound resilience (%) | 54 | 30 | 70 | 32 | 37 |
|  | Thickness (a) (mm) | 0.5 | 0.5 | 0.5 | 0.3 | 0.5 |
| Base layer | Polyurethane | C | C | D | C | P |
|  | Hardness (Hs) | 65 | 65 | 65 | 65 | 70 |
|  | 200% modulus (MPa) | 6.9 | 6.9 | 4.4 | 6.9 | 6.3 |
|  | Rebound resilience (%) | 15 | 15 | 26 | 15 | 33 |
|  | Thickness (b) (mm) | 1.5 | 1.5 | 1.5 | 1.7 | 1.5 |
| Layer-thickness ratio | a/(a + b) | 0.250 | 0.250 | 0.250 | 0.150 | 0.250 |
| Toner | Weight-average particle diameter (μm) | 6 | 6 | 6 | 6 | 8 |
|  | Shape | Perfectly spherical | Irregularly shaped | Perfectly spherical | Perfectly spherical | Perfectly spherical |
| Printing test | 23° C. 50% Number of printouts | 120,000 | 140,000 | 40,000 | 3,000 | 90,000 |
|  | Passing of toner | Observed | Observed | Observed | Observed | Observed |
|  | 10° C. 15% Number of printouts | 30,000 | 30,000 | 24,000 | 10 | 22,000 |
|  | Passing of toner | Not observed | Not observed | Observed | Observed | Observed |

TABLE 6

| Polyurethane | Polyol | Prepolymer Number-average molecular weight | Isocyanate | NCO content (%) | Parts by mass | Crosslinking agent 1,4-butanediol/ trimethylolpropane | Parts by mass |
|---|---|---|---|---|---|---|---|
| A | polycaprolactone polyol | 2000 | 4,4'-diphenylmethane diisocyanate | 6.7 | 100 | 60/40 | 6.82 |
| B | polycaprolactone polyol | 2000 | 4,4'-diphenylmethane diisocyanate | 6.3 | 100 | 70/30 | 5.60 |
| C | polyethylene adipate diol | 2000 | 4,4'-diphenylmethane diisocyanate | 6.7 | 100 | 60/40 | 6.05 |
| D | polyethylene adipate diol | 2000 | 4,4'-diphenylmethane diisocyanate | 5.9 | 100 | 60/40 | 5.13 |
| E | polyethylene adipate diol | 2000 | 4,4'-diphenylmethane diisocyanate | 8.5 | 100 | 70/30 | 8.39 |
| F | polyethylene adipate diol | 2000 | 4,4'-diphenylmethane diisocyanate | 10.0 | 100 | 80/20 | 9.79 |
| G | polycaprolactone polyol | 2000 | 4,4'-diphenylmethane diisocyanate | 6.7 | 100 | 80/20 | 6.46 |
| H | polycaprolactone polyol | 2000 | 4,4'-diphenylmethane diisocyanate | 8.0 | 100 | 90/10 | 7.80 |
| I | polycaprolactone polyol | 2000 | 4,4'-diphenylmethane diisocyanate | 6.7 | 100 | 72/28 | 6.82 |
| J | polycaprolactone polyol | 2000 | 4,4'-diphenylmethane diisocyanate | 6.7 | 100 | 82/18 | 6.46 |
| K | polyethylene adipate diol | 2000 | 4,4'-diphenylmethane diisocyanate | 6.3 | 100 | 85/15 | 6.56 |
| L | polycaprolactone polyol | 2000 | 4,4'-diphenylmethane diisocyanate | 5.5 | 100 | 80/20 | 5.11 |
| M | Polyethylene butylene adipate diol | 2000 363.64 Parts by mass | Urethane-modified MDI (Polyisocyanate) | 31.0 100 Parts by mass | — | N,N-bis(2-hydroxypropyl) aniline | 36.36 |
| N | polycaprolactone polyol | 2000 | 4,4'-diphenylmethane diisocyanate | 7.1 | 100 | 80/20 | 6.41 |
| O | polycaprolactone polyol | 2000 | 4,4'-diphenylmethane diisocyanate | 7.5 | 100 | 80/20 | 6.75 |
| P | polycaprolactone polyol | 2000 | 4,4'-diphenylmethane diisocyanate | 7.5 | 100 | 72/28 | 6.75 |
| Q | polycaprolactone polyol | 2000 | 4,4'-diphenylmethane diisocyanate | 7.5 | 100 | 70/30 | 6.75 |

As shown in Tables 1 and 2 and Tables 4 and 5, the cleaning blades produced in Examples each had both excellent durability (abrasion resistance) and excellent cleaning ability when polymerized toner was used. The cleaning blades were able to improve those characteristics particularly under low-temperature and low-humidity conditions. On the other hand, the cleaning blades in Comparative Examples were not able to achieve sufficient durability (abrasion resistance) and sufficient cleaning ability.

INDUSTRIAL APPLICABILITY

The cleaning blades of the present invention can be suitably used for an electrostatographic copier on which plain paper is used as the recording paper.

BRIEF DESCRIPTION OF THE DRAWINGS

FIG. 3(a) is a vertical cross-sectional view,
and FIG. 3(b) is a cross-sectional view along line A-A of FIG. 3(a).

Figure 1:
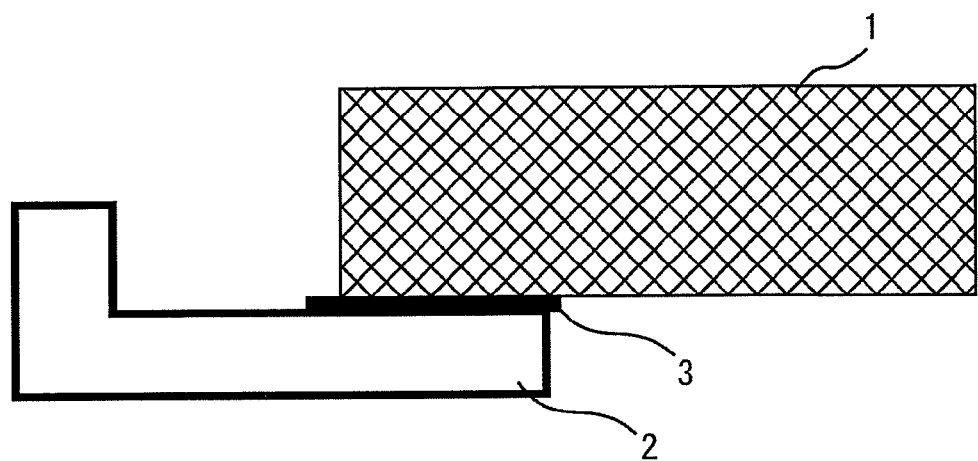
FIG. 1 is a schematic view illustrating a known cleaning blade and a cleaning behavior thereof.
Figure 1:
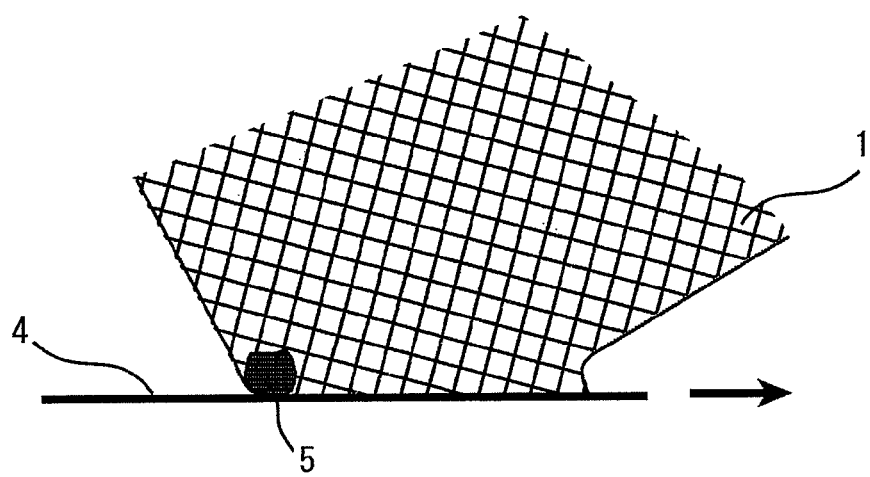
Figure 2:
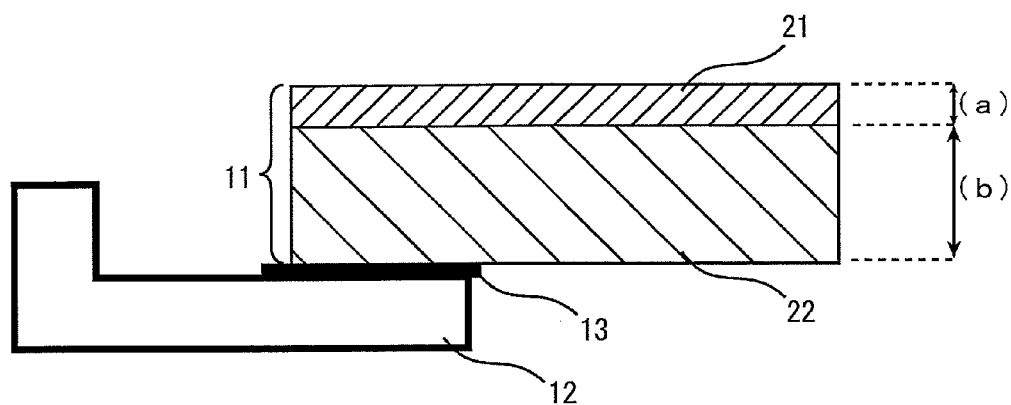
FIG. 2 is a schematic view illustrating a cleaning blade of the present invention and a cleaning behavior thereof.
Figure 2:
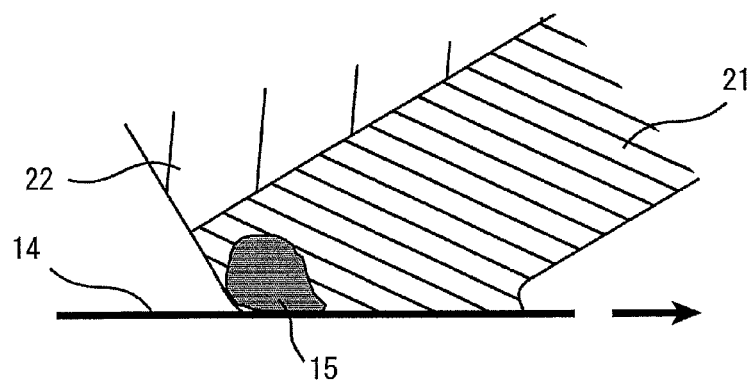
Figure 3:
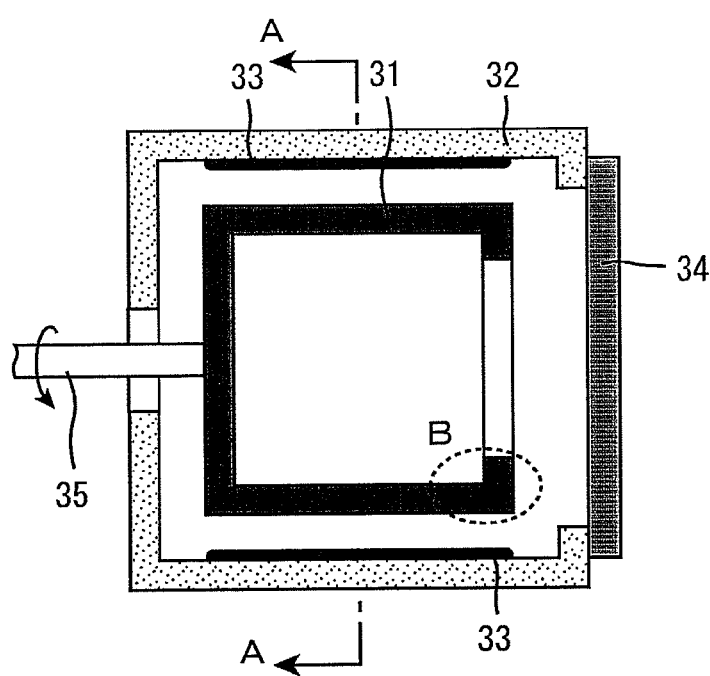
FIG. 3 is a schematic view of a centrifugal molding machine.
Figure 3:
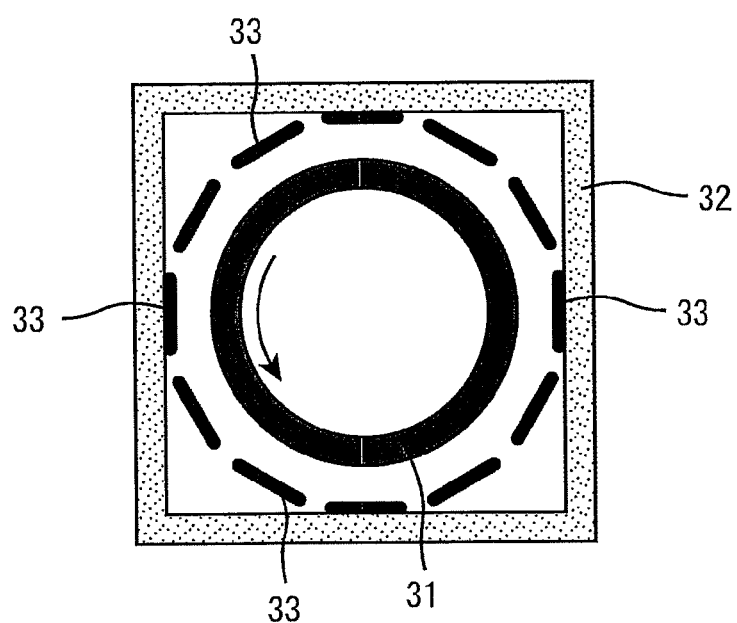
Figure 4:
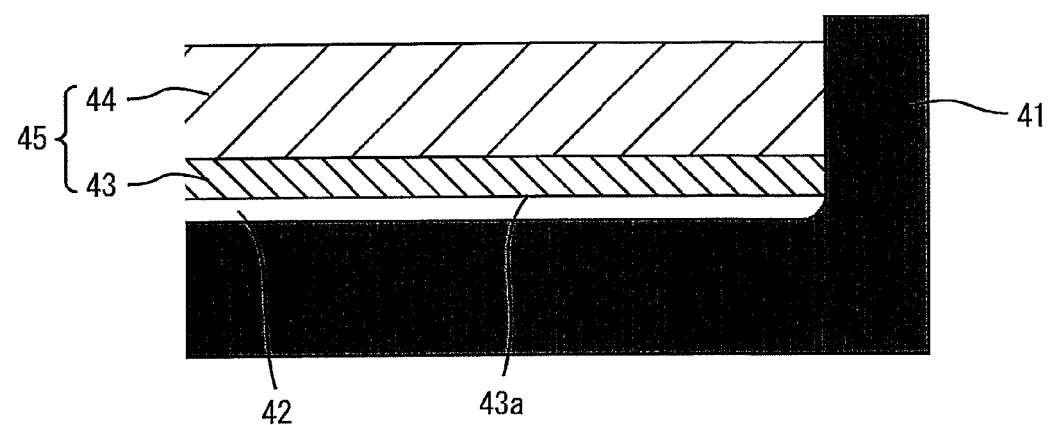
FIG. 4 is a partially enlarged cross-sectional view which schematically illustrates the inside of a mold in centrifugal molding in a production method of the present invention.

EXPLANATION OF THE SYMBOLS 1, 11 Elastic rubber member
2, 12 Supporting member
3, 13 Adhesive layer
4, 14 Image carrier (partner material)
5, 15 Stress concentration zone
21 Edge layer
22 Base layer
31, 41 Mold
32 Heat insulating chamber
33 Heater
34 Full door
35 Rotating shaft
42 Silicone rubber layer
43 Molded body to be the edge layer
43a Silicone-rubber-contacting surface
44 Molded body to be the base layer
45 Elastic-rubber-member material layer

The invention claimed is:

1. A cleaning blade for an electrophotographic device, comprising:
an elastic rubber member; and
a supporting member,
wherein
said elastic rubber member has a double layer structure including an edge layer and a base layer,
said edge layer is made of a material with a JIS-A hardness of 65° to 72° at 23° C. and a rebound resilience of 10 to 35%, and
said base layer is made of a material with a JIS-A hardness of 70° to 80° at 23° C. and a rebound resilience of 40 to 70%, the JIS-A hardness value being larger than the value of hardness of said edge layer.

2. The cleaning blade for an electrophotographic device according to claim 1,
wherein
the elastic rubber member has a thickness ratio (a/(a+b)) of 0.05 to 0.5, which is a ratio of a thickness (a) of the edge layer to a sum (a+b) of the thickness (a) of the edge layer and a thickness (b) of the base layer, and
said thickness (a) of the edge layer is more than 50 µm.

3. The cleaning blade for an electrophotographic device according to claim 1, wherein the edge layer has a 200% modulus of within the range of 3.5 to 12 MPa at 23° C.

4. The cleaning blade for an electrophotographic device according to claim 1, wherein the edge layer has a JIS-A hardness of 65° to 68° at 23° C. and the base layer has a rebound resilience of 45 to 70%.

5. A cleaning blade for an electrophotographic device, comprising:
an elastic rubber member; and
a supporting member, wherein said elastic rubber member has a double layer structure including an edge layer and a base layer, said edge layer is made of a material with a JIS-A hardness of 65° to 72° at 23° C., a rebound resilience of 37 to 60%, and a 200% modulus of 3 to 8 MPa at 23° C., and said base layer is made of a material with a JIS-A hardness of 65° to 70° at 23° C. and a rebound resilience of 5 to 30%.

6. The cleaning blade for an electrophotographic device according to claim 5, wherein the elastic rubber member has a thickness ratio (a/(a+b)) of 0.05 to 0.75, which is a ratio of a thickness (a) of the edge layer to a sum (a+b) of the thickness (a) of the edge layer and a thickness (b) of the base layer, and said thickness (a) of the edge layer is more than 50 μm.

7. The cleaning blade for an electrophotographic device according to claim 5, wherein the edge layer is made of a material with a JIS-A hardness of 65° to 68° at 23° C.

8. The cleaning blade for an electrophotographic device according to claim 1, wherein the edge layer and the base layer each are made of a polyurethane.

9. The cleaning blade for an electrophotographic device according to claim 8, wherein the polyurethane contains a polyol unit that is derived from a polycaprolactone polyol and/or a polyester polyol.

10. The cleaning blade for an electrophotographic device according to claim 1, wherein the edge layer is made of a polyurethane containing a polyol unit that is derived from a polycaprolactone polyol and/or a polyester polyol, and the base layer is made of a polyurethane containing a polyol unit that is derived from a polycaprolactone polyol.

11. The cleaning blade for an electrophotographic device according to claim 5, wherein the edge layer is made of a polyurethane containing a polyol unit that is derived from a polycaprolactone polyol, and the base layer is made of a polyurethane containing a polyol unit that is derived from a polyester polyol.

12. A method of producing the cleaning blade for an electrophotographic device according to claim 1, which employs centrifugal molding, comprising the steps of:

(I) producing a silicone rubber molded body inside a mold;

(II) producing a molded body that is to be an edge layer of an elastic rubber member, on the silicone rubber molded body produced in said step (I); and (III) producing a molded body that is to be a base layer of the elastic rubber member, on the molded body that is to be the edge layer which has been produced in said step (II), wherein said molded body to be the edge layer is made of a material with a JIS-A hardness of 65° to 72° at 23° C. and a rebound resilience of 10 to 35%, and said molded body to be the base layer is made of a material with a JIS-A hardness of 70° to 80° at 23° C. and a rebound resilience of 40 to 70%, the JIS-A hardness value being larger than the value of hardness of said edge layer.

13. A method of producing the cleaning blade for an electrophotographic device according to claim 5, which employs centrifugal molding, comprising the steps of:

(I) producing a silicone rubber molded body inside a mold;

(II) producing a molded body that is to be an edge layer of an elastic rubber member, on the silicone rubber molded body produced in said step (I); and (III) producing a molded body that is to be a base layer of the elastic rubber member, on the molded body that is to be the edge layer which has been produced in said step (II), wherein said molded body to be the edge layer is made of a material with a JIS-A hardness of 65° to 72° at 23° C., a rebound resilience of 37 to 60%, and a 200% modulus of 3 to 8 MPa at 23° C., and said molded body to be the base layer is made of a material with a JIS-A hardness of 65° to 70° at 23° C. and a rebound resilience of 5 to 30%.

14. The method of producing the cleaning blade for an electrophotographic device according to claim 12, wherein the silicone rubber molded body is produced from an addition curable silicone rubber composition.

15. The method of producing the cleaning blade for an electrophotographic device according to claim 14, wherein the addition curable silicone rubber composition contains an organopolysiloxane with at least two unsaturated aliphatic hydrocarbon groups bonded to a silicon atom;

an organohydrogen polysiloxane with at least two hydrogen atoms bonded to a silicon atom; and a platinum-based catalyst.

\* \* \* \* \*